Figure 1:
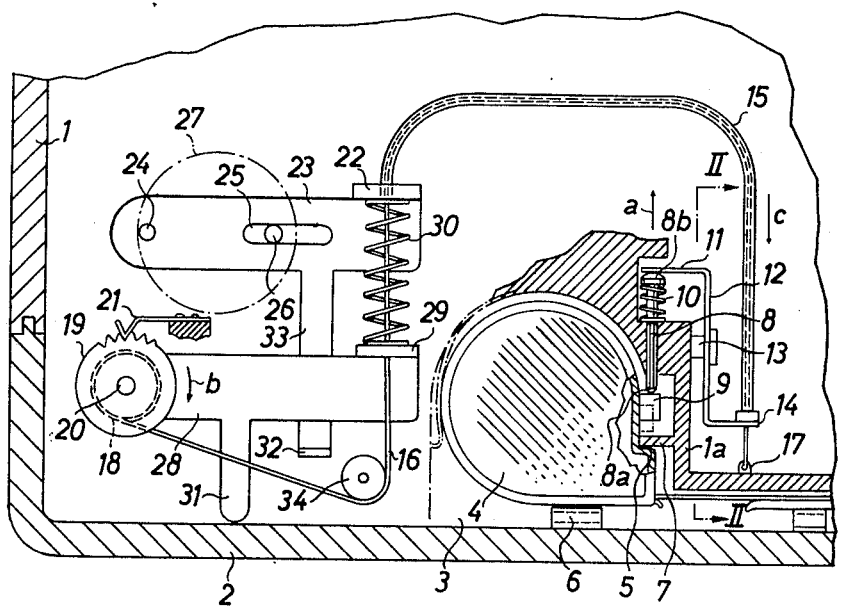

Oct. 19, 1965     H. HACKENBERG     3,212,421
DEVICE FOR ADJUSTING EXPOSURE-DETERMINING
STRUCTURE OF A CAMERA
Filed Dec. 2, 1964

INVENTOR.
HUBERT HACKENBERG

BY Michael J. Striker

United States Patent Office 3,212,421
Patented Oct. 19, 1965

3,212,421
DEVICE FOR ADJUSTING EXPOSURE-DETER-
MINING STRUCTURE OF A CAMERA
Hubert Hackenberg, Munich-Solln, Germany, assignor to
Agfa Aktiengesellschaft, Leverkusen, Germany
Filed Dec. 2, 1964, Ser. No. 415,395
Claims priority, application Germany, Dec. 7, 1963,
A 44,740
10 Claims. (Cl. 95—31)

The present invention relates to cameras.

More particularly, the present invention relates to cameras which are capable of being adjusted so as to determine the extent to which film in a camera is exposed.

For example, in cameras which are capable of automatically determining the extent of film exposure in accordance with the lighting conditions, it is necessary to adjust the exposure-determining structure in accordance with the speed of the film which is exposed in the camera. In order to introduce into the camera an indication of the speed of the film, a film cartridge which carries the film can carry an indicating member which by its position on the cartridge and thus by its position in the camera housing will be indicative of the speed of the film which is introduced into the camera. A suitable structure cooperates with this indicating member of the cartridge to adjust the camera structure, such as the structure for automatically setting the camera according to the lighting conditions, in accordance with the film speed.

In order to produce an adjustment of this latter type it is possible, for example, to change the angular position of a moving coil instrument such as a galvanometer, this instrument forming part of the structure for setting the camera in accordance with the light intensity. However, it is also possible to adjust other elements, such as an adjustable cover of a window of the camera through which light reaches a photosensitive element of the structure for automatically setting the camera according to the lighting conditions. If desired, the adjustment may be applied to a variable resistor of the electrical circuit of the structure for determining the exposure according to the lighting conditions. Furthermore, with cameras of this latter type it is common to provide a scanning member which has a predetermined starting position and which through a suitable train of transmitting elements will transmit the movement of the scanning member to camera adjusting structure for determining the extent of exposure of film therein. The adjustment for the film speed, for example, can be provided simply by adjusting the relative positions between a pair of motion-transmitting elements of such a train.

A primary object of the present invention is to provide a structure of the above type which is extremely simple.

A further object of the present invention is to provide a structure of the above type which is capable of not only automatically setting the camera structure according to the film speed but which in addition is capable of making a further adjustment according to any other desired additional exposure-determining factor.

Such an additional exposure-determining factor may be, for example, the exposure time, the aperture, the filter factor in the event a filter is used, or any correction factor as, for example when an exposure is made under unusual lighting conditions such as back lighting.

In particular, it is an object of the present invention to provide an element which on the one hand is capable of having its position automatically adjusted according to the speed of the film in the camera and which on the other hand can be displaced to a position different from that which it assumes in accordance with the film speed.

With these objects in view, the invention includes, in a camera, a camera housing means which defines in its interior a chamber for receiving a film cartridge which is provided with an indicating member whose position with respect to a stop surface of the film cartridge is indicative of the speed of the film which is in the cartridge. The camera housing means itself has a stop surface which engages the stop surface of the cartridge to determine the position of the latter in the camera housing means, and thus the position of the indicating member which is carried by the film cartridge is indicative of the speed of the film in the cartridge. A feeler means is carried by the camera housing means for engaging the indicating member so as to have the position of the feeler means determined in accordance with the speed of the film, and this feeler means is operatively connected to one end of an elongated sheath whose opposite end is connected to an adjusting means for adjusting the camera according to the speed of the film therein. An elongated cable is carried by the camera housing in the material thereof, extends along a predetermined path, and passes through the sheath so as to support the latter for shifting movement. Therefore, when the feeler means is displaced by the indicating member of the film cartridge to a given position, the end of the sheath distant from the feeler means will actuate the adjusting means, as a result of shifting of the sheath along the cable, so that in this way it is possible to automatically adjust the camera in accordance with the speed of the film. In addition, because the actuation of the adjusting means is brought about by way of a flexible sheath which is supported for shifting movement on a cable, additional structure may be provided for changing the path along which the cable extends, in accordance with an additional exposure-determining factor, so that in this way the adjusting means can have its position changed independently of the feeler means so as to introduce in this way the additional exposure-determining factor.

Figure 2:
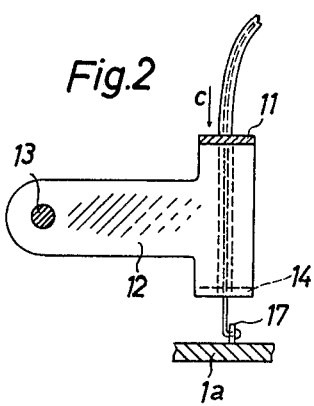

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional and partly schematic plan view of a camera housing and structure of the invention situated therein; and FIG. 2 is a section taken along line II—II of FIG. 1 in the direction of the arrows.

In the illustrated example of one possible structure according to the present invention, the camera includes a housing means 1 provided with a rear door 2 connected to the remainder of the housing means 1 so as to be movable in any manner well known in the art by the operator to and from the closed position shown in FIG. 1. The camera housing means 1 defines in its interior a cartridge chamber 3 for receiving a film cartridge 4, this cartridge 4 being provided with a stop surface 5 which engages a stop surface 7 provided by a rigid portion 1a of the camera housing means 1, so that in this way the position of the cartridge 4 in the interior of the camera housing means is determined. The rear door 2 of the camera housing carries a leaf spring 6 which presses against the cartridge 4 so as to reliably urge the stop surface 5 of the cartridge 4 against the stop surface 7 of the interior part 1a of the camera housing means 1.

This interior housing portion 1a of the camera housing means 1 is also formed with a bore in which an elongated feeler member 8 is guided for longitudinal movement, this feeler member 8 forming part of a feeler means of the invention. The feeler member 8 has a free end 8a which engages an indicating member 9 carried by the cartridge 4. The distance between the indicating member 9 and the stop surface 5 of the cartridge 4 is indicative of the speed of the film which is in the cartridge 4, and since the position of the surface 5 is determined by the surface 7 of the camera housing means, the position of the indicating member 9 will also be determined, so that the position of the feeler member 8 will be determined by the indicating member 9 in accordance with the speed of the film which is in the cartridge 4. Depending upon the particular speed of this film the indicating member 9 can have different positions such as that which is shown in solid lines in FIG. 1 or that which is indicated in dot-dash lines.

Distant from its end 8a which engages the indicating member 9, the elongated feeler member 8 has an enlarged end 8b against which one end of the coil spring 10 presses, this coil spring 10 being coiled about the elongated feeler member 8 and engaging with its opposite end a surface of the inner structure 1a of the camera housing means. Therefore, this spring 10 urges the feeler member 8 away from the indicating member 9.

Thus, the spring 10 urges the feeler member 8 in the direction of the arrow a, shown in FIG. 1, and in this way the enlarged end 8b of the feeler member 8 is urged into engagement with an end 11 of a lever 12 which also forms part of the feeler means, this lever 12 having, as shown most clearly in FIG. 2, a downwardly directed arm which adjacent its bottom end is supported for pivotal movement by a stationary pin 13 which is carried by the camera housing structure 1a. The end 14 of the lever 12 which is distant from the end 11 thereof is connected to one end of an elongated flexible sheath 15 of a Bowden cable assembly which forms part of the structure of the invention. Thus, one end of the sheath 15 is constrained to move with the end 14 of the lever 12. An elongated cable 16 extends through the sheath 15 and through an opening at the end 14 of the lever 12, this latter opening of course being aligned with the sheath 15, and a free end of the cable 16 is fixed to an eye 17 which is fixedly carried by the interior camera housing structure 1a. The cable 16 extends beyond the end of the sheath 15 distant from the lever 12 around a rotary guide roller 34 supported for movement by any suitable pin carried by the camera housing means, and beyond the rotary guide roller 34 the cable 16 is connected to and wound onto a rotary spool 18 which is coaxially fixed to a shaft 20 which is supported for turning movement by the camera housing means and which is connected to an unillustrated structure accessible to the operator so that the operator can manually turn the shaft 20 and the spool 18 therewith. The spool 18 carries a toothed wheel 19 which forms part of a detent means. Thus, a leaf spring 21 which is fixedly connected at one end to a stationary part of the camera housing means has a V-shaped free end which can enter into the spaces between the teeth of the wheel 19 which is fixed to the spool 18, so that in this way the spool 18 will be releasably maintained to whatever angular position it is moved to by the operator.

The end of the sheath 15 which is distant from the end 14 of the lever 12 is connected to a lug 22 of a lever 23 which is supported for turning movement by a stationary pivot 24 carired by the camera housing means 1. Instead of the turnable lever 23 it is possible also to provide a shiftable control member. The lever or lever means 23 forms an adjusting means of the camera for adjusting the latter according to the film speed. For this purpose the lever means 23 is formed with an elongated slot 25 receiving a pin 26 which is fixed to the housing 27 of a galvanometer in the illustrated example. This housing 27 is simply indicated in a dot-dash line, and it is supported for turning movement about its central axis which extends parallel to the pivot pin 24. Thus, in accordance with the angular position of the lever 23 the galvanometer housing 27 will have its angular position change, and in this way the factor of the speed of the film which is in the cartridge 4 can be introduced into the camera.

The shaft 20 which fixedly carries the spool 18 also serves to support for free turning movement with respect to the shaft 20 an elongated lever 28 which has a lug 29 which extends in a direction approximately parallel to the lug 22 of the lever 23. The lug 22 as well as the lug 29 are formed with openings through which the cable 16 freely passes. Between the lugs 22 and 29 is situated an elongated coil spring 30 which is compressed between the lugs 22 and 29. This coil spring 30 forms a spring means for urging the feeler means into engagement with the indicating member 9. The lever 28 has an arm 31 which engages the inner surface of the door 2 when the latter is in its illustrated closed position. When the door 2 is displaced to its open position, the spring 30 will of course turn the lever 28 in the direction of the arrow b, and in order to limit the extent of turning of the lever 28 relative to the lever 23 at this time a limiting means is provided, this limiting means in the illustrated example taking the form of an elongated arm 33 which is fixed to and extends from the lever 23 and which terminates distant therefrom in a lug 32 which is situated in the path of turning movement of the lever 28 by the spring 30, so that the spring 30 can only turn the lever 28 relative to the lever 23 until the lever 28 engages the lug 32, and in this way the limiting means 32, 33 will maintain the levers 28 and 23 extending respectively in generally parallel directions even when the door 2 is displaced to its open position. Of course, the spring 30 is still under compression when the lever 28 engages the lug 32. In the case of the lever 28 also, it is possible to use instead of this lever a shiftable member.

Assuming now that the rear door 2 of the camera is displaced from the closed position of FIG. 1 to an open position away from the remainder of the camera housing, then of course the lever 28 will turn in the direction of the arrow b inasmuch as the inner surface of the rear camera wall 2 no longer engages the free end of the extension 31 of the lever 28. This movement of the lever 28 eliminates the force with which the spring 30 presses on the lever 22, so that the spring 10, which is weaker than the spring 30, can now expand in order to displace the feeler member 8 away from the member 9 in a direction outwardly of the chamber 3, and by acting on the lever 12 the feeler member 8 will permit the sheath 15 to slide along the cable 16, so that the sheath 15 follows the movement of the lever 28 while the feeler member 8 is retracted away from the indicating member 9. Of course, the lug 32 guarantees that the levers 23 and 28 remain generally parallel to each other. At this time the spring 10 is capable of expanding to an extent sufficient to displace the feeler 8 completely out of the chamber 3. The cartridge 4 can now be removed from the camera housing and replaced by a new cartridge. When the new cartridge is introduced the feeler 8 is completely out of the way of and does not in any way interfere with the new cartridge.

Thereafter, of course, the rear door 2 of the camera will be returned to its closed position shown in the drawing, so that the spring 6 will now press the stop surface 5 of the cartridge 4 against the stop surface 7, and thus the cartridge assumes its precisely determined position within the camera housing. Moreover, the lever 28 is of course displaced in a direction opposite to that indicated by the arrow b by the return of the door 2 which engages the extension 31 of the lever 28. The spring 30 will transmit the movement of the lever 28 to the lever 23 and thus to the sheath 15 which will now slide along the cable 16, so that the sheath 15 moves in the direction of the arrow c thus providing a clockwise turning of the lever 12 about the pin 13, as viewed in FIG. 2. The end 11 of the lever 12 will therefore displace the feeler member 8 in opposition to the spring 10, compressing the latter, until the end 8a of the feeler 8 engages the indicating member 9. Once the movement of the lever 28 transmits through the spring 30 a movement of the lever 23 and the sheath 15 sufficient to place the feeler 8 in engagement with the indicating member 9, the lever 23 will of course stop moving and during the continued moving of the lever 28 the spring 30 will simply be compressed further without producing any further movement of the feeler member 8 whose movement is arrested by the stop member 9, so that in this way the position of the lever 23 is determined by the position of the feeler 8 and from the moment when the feeler 8 engages the indicating member 9 the lever 23 stops turning and the spring 30 only continues to be compressed during the further movement of the lever 28 with respect to the lever 23. This movement of the lever 23 has of course provided through the slot 25 and the pin 26 a termination of the angular position of the instrument 27 according to the film speed.

Assuming now that the operator desires to introduce into the camera other exposure-determining factors such as, for example, a correction factor to take care of a back lighting condition or a filter factor or even a preselected exposure time value, for example, which factor should be introduced by changing the angular position of the instrument 27, then all that the operator need do is turn the shaft 20 which can be manually turned by the unillustrated structure connected thereto and accessible to the operator, and the result is that the spool 18 will wind the cable 16 onto this spool. For example, the spool 18 may be turned in the direction of the arrow b so as to wind the cable 16 onto the spool. However, if desired the spool 18 can be turned in the opposite direction so as to unwind some of the cable 16 from the spool. It will be observed that the cable 16 extends along a predetermined path in the position of the parts shown in FIG. 1. The result of winding some of the cables 16 onto the spool 18 or unwinding some of the cables 16 from the spool 18 will result in changing the path along which the cable 16 extends in a camera housing, and although the position of the end of the sheath 15 fixed to the lever 12 will not change, the position of the end of the sheath 15 fixed to the lug 22 of the lever 23 can change because of the freedom of the free end of the sheath 15 fixed to the lug 22 to shift about with any lengthening or shortening of the cable 16. Thus, by regulating the length of the cable 16 which extends between the eye 17 and the spool 18 it is possible to change the path along which the cable 16 extends, and thus regulate the position of the free end of the sheath 15 which is fixed to the lever 23. The result is that a further adjusting movement of the lever 23 to change the angular position of the instrument 27, and thus the additional exposure-determining factor can be introduced into the camera in this way.

The invention of course is not limited to the details described above. For example, instead of providing between the sheath 15 and the feeler 8 a connection according to which a lever presses against an end of the feeler 8, it is possible to provide a positive connection fixing the end of the sheath 15 to the feeler 8 for movement therewith.

It will be understood that each of the elements described above, or two or more together, may also find a useful application in other types of cameras differing from the types described above.

While the invention has been illustrated and described as embodied in exposure-determining structure for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, camera housing means defining a chamber for receiving a film cartridge, said camera housing means having in said chamber a stop surface engaged by a stop surface of said cartridge for determining the position of the latter in said chamber and said cartridge carrying an indicating member whose position with respect to said stop surface of said cartridge is indicative of the speed of the film therein, so that the position of said indicating member in said chamber is also indicative of the film speed; feeler means carried by said camera housing means and engaging said indicating member of a cartridge in said chamber to be located at a position determined by the position of said indicating member with respect to said stop surfaces; an elongated sheath one end of which is operatively connected to said feeler means; an elongated cable situated in said camera housing means, extending along a predetermined path, and extending through said sheath to support the latter for sliding movement; and adjusting means supported by said camera housing means for adjusting the extent to which film is exposed, said adjusting means being operatively connected with the other end of said sheath, so that when said sheath is moved by said feeler means said adjusting means will also be moved to automatically adjust the extent to which film in the camera is exposed in accordance with the position of said indicating member with respect to said stop surfaces.

2. In a camera, in combination, camera housing means defining a chamber for receiving a film cartridge, said camera housing means having in said chamber a stop surface engaged by a stop surface of said cartridge for determining the position of the latter in said chamber and said cartridge carrying an indicating member whose position with respect to said stop surface of said cartridge is indicative of the speed of the film therein, so that the position of said indicating member in said chamber is also indicative of the film speed; feeler means carried by said camera housing means and engaging said indicating member of a cartridge in said chamber to be located at a position determined by the position of said indicating member with respect to said stop surfaces; an elongated sheath one end of which is operatively connected to said feeler means; an elongated cable situated in said camera housing means, extending along a predetermined path, and extending through said sheath to support the latter for sliding movement; adjusting means supported by said camera housing means for adjusting the extent to which film is exposed, said adjusting means being operatively connected with the other end of said sheath, so that when said sheath is moved by said feeler means said adjusting means will also be moved to automatically adjust the extent to which film in the camera is exposed in accordance with the position of said indicating member with respect to said stop surfaces, said cable being fixed at one end to said housing means; and manually operable means operatively connected to said cable for changing the path along which said cable extends so as to change the location of said end of said sheath which is connected to said adjusting means, whereby said adjusting means can be actuated by said means for changing the path along which said cable extends in order to adjust the extent to which film in the camera is exposed according to an additional factor.

3. In a camera, in combination, camera housing means defining a chamber for receiving a film cartridge, said camera housing means having in said chamber a stop surface engaged by a stop surface of said cartridge for determining the position of the latter in said chamber and said cartridge carrying an indicating member whose position with respect to said stop surface of said cartridge is indicative of the speed of the film therein, so that the position of said indicating member in said chamber is also indicative of the film speed; feeler means carried by said camera housing means and engaging said indicating member of a cartridge in said chamber to be located a position determined by the position of said indicating member with respect to said stop surfaces; an enlongated sheath one end of which is operatively connected to said feeler means; an elongated cable situated in said camera housing means, extending along a predetermined path, and extending through said sheath to support the latter for sliding movement; adjusting means supported by said camera housing means for adjusting the extent to which film is exposed, said adjusting means being operatively connected with the other end of said sheath, so that when said sheath is moved by said feeler means said adjusting means will also be moved to automatically adjust the extent to which film in the camera is exposed in accordance with the position of said indicating member with respect to said stop surfaces; and spring means coacting with the end of said sheath which is connected with said adjusting means for acting on said sheath to urge the latter along said cable in a direction which displaces said feeler means into engagement with said indicating member of said cartridge.

4. In a camera, in combination, camera housing means defining a chamber for receiving a film cartridge, said camera housing means having in said chamber a stop surface engaged by a stop surface of said cartridge for determining the position of the latter in said chamber and said cartridge carrying an indicating member whose position with respect to said stop surface of said cartridge is indicative of the speed of the film therein, so that the position of said indicating member in said chamber is also indicative of the film speed; feeler means carried by said camera housing means and engaging said indicating member of a cartridge in said chamber to be located a position determined by the position of said indicating member with respect to said stop surfaces; an elongated sheath one end of which is operatively connected to said feeler means; an elongated cable situated in said camera housing means, extending along a predetermined path, and extending through said sheath to support the latter for sliding movement; adjusting means supported by said camera housing means for adjusting the extent to which film is exposed, said adjusting means being operatively connected with the other end of said sheath, so that when said sheath is moved to said feeler means said adjusting means will also be moved to automatically adjust the extent to which film in the camera is exposed in accordance with the position of said indicating member with respect to said stop surfaces; spring means coacting with the end of said sheath which is connected with said adjusting means for acting on said sheath to urge the latter along said cable in a direction which displaces said feeler means into engagement with said indicating member of said cartridge; manually operable means carried by said camera housing means for rendering a film cartridge removable therefrom, said manually operable means when actuated to render a cartridge removable from said housing means automatically eliminating the pressure of said spring means on said sheath; and second spring means operatively connected to said feeler means for retracting the latter to an inoperative position when said manually operable means is actuated to render a cartridge removable from said housing means, said second spring means being weaker than said first-mentioned spring means.

5. In a camera as recited in claim 4, said manually operable means including a rear camera door which is displaceable for giving access to said chamber which receives said cartridge.

6. In a camera, in combination, camera housing means defining in its interior a cartridge chamber for receiving a film cartridge which carries an indicating member indicating the speed of film in the cartridge, said indicating member being situated at a given distance from a stop surface of said cartridge for indicating the speed of film therein and said camera housing having at said chamber thereof a stop surface engaged by said stop surface of said cartridge so as to determine the position of said indicating member in said housing means, and said camera housing means having a movable rear door through which access may be had to said chamber for removing a cartridge therefrom and for introducing a cartridge into said chamber; a pair of lever means carried by said camera housing means in the interior thereof and spring means situated between and engaging said pair of lever means for urging one of said lever means outwardly to be given position when said rear door of said camera housing means is dispaced therefrom to give access to said chamber, said one lever means being displaced in opposition to said spring means inwardly into the interior of said camera housing means when said door is in a closed position closing said camera housing means, said spring means responding to movement of said one lever means when said door is placed in said closed position thereof for urging said other lever means to a given position in said camera housing means, said other lever means actuating a structure of the camera which determines the extent to which film therein is exposed; feeler means carried by said camera housing means for engaging said indicating member of said cartridge to assume a position determined by the position of said indicating member; a sheath having opposed ends operatively connected to said other lever means and said lever means, said spring means acting through said other lever means on said sheath for urging said feeler means into engagement with said member carried by said cartridge, so that the position of said other lever means will be determined by said indicating member and thus the extent of exposure of film in the camera will be determined by said indicating member; and a cable in said camera housing extending along a predetermined path and extending through said sheath to support the latter for movement.

7. In a camera, in combination, camera housing means defining in its interior a cartridge chamber for receiving a film cartridge which carries an indicating member indicating the speed of film in the cartridge, said indicating member being situated at a given distance from a stop surface of said cartridge for indicating the speed of film therein and said camera housing having at said chamber thereof a stop surface engaged by said stop surface of said cartridge so as to determine the position of said indicating member in said housing means, and said camera housing means having a movable rear door through which access may be had to said chamber for removing a cartridge therefrom and for introducing a cartridge into said chamber; a pair of lever means carried by said camera housing means in the interior thereof and spring means situated between and engaging said pair of lever means for urging one of said lever means outwardly to a given position when said rear door of said camera housing means is displaced therefrom to give access to said chamber, said one lever means being displaced in opposition to said spring means inwardly into the interior of said camera housing means when said door is in a closed position closing said camera housing means, said spring means responding to movement of said one lever means when said door is placed in said closed position thereof for urging said other lever means to a given position in said camera housing means, said other lever means actuating a structure of the camera which determines the extent to which film therein is exposed; feeler means carried by said camera housing means for engaging said indicating member of said cartridge to assume a position determined by the position of said indicating member; a sheath having opposed ends operatively connected to said other lever means and said lever means, said spring means acting through said other lever means on said sheath for urging said feeler means into engagement with said member carried by said cartridge, so that the position of said other lever means will be determined by said indicating member and thus the extent of exposure of film in the camera will be determined by said indicating member; a cable in said camera housing extending along a predetermined path and extending through said sheath to support the latter for movement; and limiting means carried by one of said lever means and located in the path of movement of the other of said lever means when said door is displaced to an open position for limiting the extent to which said lever means are displaced apart from each other by said spring means.

8. In a camera, in combination, camera housing means defining a chamber for receiving a film cartridge, said camera housing means having in said chamber a stop surface engaged by a stop surface of said cartridge for determining the position of the latter in said chamber and said cartridge carrying an indicating member whose position with respect to said stop surface of said cartridge is indicative of the speed of the film therein, so that the position of said indicating member in said chamber is also indicative of the film speed; feeler means carried by said camera housing means and engaging said indicating member of a cartridge in said chamber to be located at a position determined by the position of said indicating member with respect to said stop surfaces; an elongated sheath one end of which is operatively connected to said feeler means; an elongated cable situated in said camera housing means, extending along a predetermined path, and extending through said sheath to support the latter for sliding movement; and adjusting means supported by said camera housing means for adjusting the extent to which film is exposed, said adjusting means being operatively connected with the other end of said sheath, so that when said sheath is moved by said feeler means said adjusting means will also be moved to automatically adjust the extent to which film in the camera is exposed in accordance with the position of said indicating member with respect to said stop surfaces, said feeler means including an elongated feeler member guided for longitudinal movement by said camera housing means, and a lever turnably carried by said camera housing means and engaged by said feeler member to be turned thereby, said lever being connected directly to said sheath.

9. In a camera, in combination, camera housing means defining in its interior a cartridge chamber for receiving a film cartridge which carries an indicating member indicating the speed of film in the cartridge, said indicating member being situated at a given distance from a stop surface of said cartridge for indicating the speed of film therein and said camera housing having at said chamber thereof a stop surface engaged by said stop surface of said cartridge so as to determine the position of said indicating member in said housing means, and said camera housing means having a movable rear door through which access may be had to said chamber for removing a cartridge therefrom and for introducing a cartridge into said chamber; a pair of lever means carried by said camera housing means in the interior thereof and spring means situated between and engaging said pair of lever means for urging one of said lever means outwardly to a given position when said rear door of said camera housing means is displaced therefrom to give access to said chamber, said one lever means being displaced in opposition to said spring means inwardly into the interior of said camera housing means when said door is in a closed position closing said camera housing means, said spring means responding to movement of said one lever means when said door is placed in said closed position thereof for urging said other lever means to a given position in said camera housing means, said other lever means actuating a structure of the camera which determines the extent to which film therein is exposed; feeler means carried by said camera housing means for engaging said indicating member of said cartridge to assume a position determined by the position of said indicating member; a sheath having opposed ends operatively connected to said other lever means and said lever means, said spring means acting through said other lever means on said sheath for urging said feeler means into engagement with said member carried by said cartridge, so that the position of said other lever means will be determined by said indicating member and thus the extent of exposure of film in the camera will be determined by said indicating member; a cable in said camera housing extending along a predetermined path and extending through said sheath to support the latter for movement; an elongated shaft carried by said camera housing and on which said one lever means is supported for turning movement; and a manually turnable spool carried by said shaft and onto which one end of said cable is wound, so that by turning said spool the path along which said cable extends can be changed and thus the location of the end of said sheath which is connected to said other lever means can be changed to adjust said other lever means in accordance with an additional exposure-determining factor.

10. In a camera, in combination, camera housing means defining in its interior a cartridge chamber for receiving a film cartridge which carries an indicating member indicating the speed of film in the cartridge, said indicating member being situated at a given distance from a stop surface of said cartridge for indicating the speed of film therein and said camera housing having at said chamber thereof a stop surface engaged by said stop surface of said cartridge so as to determine the position of said indicating member in said housing means, and said camera housing means having a movable rear door through which access may be held to said chamber for removing a cartridge therefrom and for introducing a cartridge into said chamber; a pair of lever means carried by said camera housing means in the interior thereof and spring means situated between and engaging said pair of lever means for urging one of said lever means outwardly to a given position when said rear door of said camera housing means is displaced therefrom to give access to said chamber, said one lever means being displaced in opposition to said spring means inwardly into the interior of said camera housing means when said door is in a closed position closing said camera housing means, said spring means responding to movement of said one lever means when said door is placed in said closed position thereof for urging said other lever means to a given position in said camera housing means, said other lever means actuating a structure of the camera which determines the extent to which film therein is exposed; feeler means carried by said camera housing means for engaging said indicating member of said cartridge to assume a position determined by the position of said indicating member; a sheath having opposed ends operatively connected to said other lever means and said lever means, said spring means acting through said other lever means on said sheath for urging said feeler means into engagement with said member carried by said cartridge, so that the position of said other lever means will be determined by said indicating member and thus the extent of exposure of film in the camera will be determined by said indicating member; a cable in said camera housing extending along a predetermined path and extending through said sheath to support the latter for movement; an elongated shaft carried by said camera housing and on which said one lever means is supported for turning movement; a manually turnable spool carried by said shaft and onto which one end of said cable is wound, so that by turning said spool the path along which said cable extends can be changed and thus the location of the end of said sheath which is connected to said other lever means can be changed to adjust said other lever means in accordance with an additional exposure-determining factor; and detent means releasably holding said spool in the angular position to which it is turned by the operator.

No references cited.

EVON C. BLUNK, *Primary Examiner.*